United States Patent [19]
Tomita et al.

[11] Patent Number: 5,475,661
[45] Date of Patent: Dec. 12, 1995

[54] OBJECTIVE LENS ACTUATOR HAVING FRAME-SHAPED LEAF SPRINGS FOR MINIMIZING FOCUSING AND TRACKING ERRORS

[75] Inventors: Hironori Tomita; Tohru Nakamura, both of Katano, Japan

[73] Assignee: Matsushita Electric Industrial Co., Ltd., Osaka, Japan

[21] Appl. No.: 43,768

[22] Filed: Apr. 6, 1993

[30] Foreign Application Priority Data

Apr. 7, 1992 [JP] Japan .................................. 4-085217

[51] Int. Cl.⁶ .................................................. G11B 7/095
[52] U.S. Cl. .................................. 369/44.16; 369/44.32; 369/54
[58] Field of Search ........................... 369/44.11, 44.15, 369/44.16, 44.32, 54, 56; 359/813–814, 823–824

[56] References Cited

U.S. PATENT DOCUMENTS

| | | | |
|---|---|---|---|
| 5,189,653 | 2/1993 | Yanagi | 369/44.32 |
| 5,208,703 | 5/1993 | Ikegame et al. | 369/44.15 X |

FOREIGN PATENT DOCUMENTS

| | | | |
|---|---|---|---|
| 59-221839 | 12/1984 | Japan . | |
| 62-229538 | 10/1987 | Japan | 369/44.15 |
| 63-124232 | 5/1988 | Japan | 369/44.15 |

*Primary Examiner*—W. R. Young
*Attorney, Agent, or Firm*—Wenderoth, Lind & Ponack

[57] ABSTRACT

An objective lens actuator in which an objective lens of a device for optically writing or reading information on a disklike recording medium is driven in a radial direction parallel to a face of the recording medium and in a direction of an optical axis perpendicular to the face of the recording medium. The actuator includes a movable member which includes the objective lens and a lens holder for holding the objective lens; a stationary member; and a pair of leaf springs each of which is of a shape of a substantially rectangular frame having a pair of first opposed edge portions and a pair of second opposed edge portions such that the first opposed edge portions of the leaf springs act as four elastic members, respectively. The elastic members each have one end fixed to the lens holder and the other end fixed to the stationary member so as to longitudinally extend substantially in parallel with each other an substantially perpendicularly to the radial direction and the direction of the optical axis. A drive member is provided for driving the movable member in the radial direction and in the direction of the optical axis, and a base is provided to support the stationary member.

6 Claims, 11 Drawing Sheets

OBJECTIVE LENS ACTUATOR HAVING FRAME-SHAPED LEAF SPRINGS FOR MINIMIZING FOCUSING AND TRACKING ERRORS

BACKGROUND OF THE INVENTION

The present invention relates to an objective lens actuator of an optical disk device for optically writing or reading information on a disklike recording medium.

In a known optical disk device, an objective lens is driven in two directions, i.e. in a direction of an optical axis perpendicular to a face of a disklike recording medium such as a compact disk, an optical disk or the like (hereinbelow, referred to as a "focusing direction F") and in a radial direction parallel to the face of the recording medium (hereinbelow, referred to as a "tracking direction T") so as to correct focusing errors resulting from vertical motion of the recording medium due to its warpage or tracking errors due to radial deviations of the disc, etc. such that recording and reproduction are performed.

In recent years, trends towards portable use and personal use of a compact disk player or a data file device employing an optical disk are gaining momentum and thus, an optical pickup for use in these devices is also required to be made more compact and inexpensive.

Figure 1:
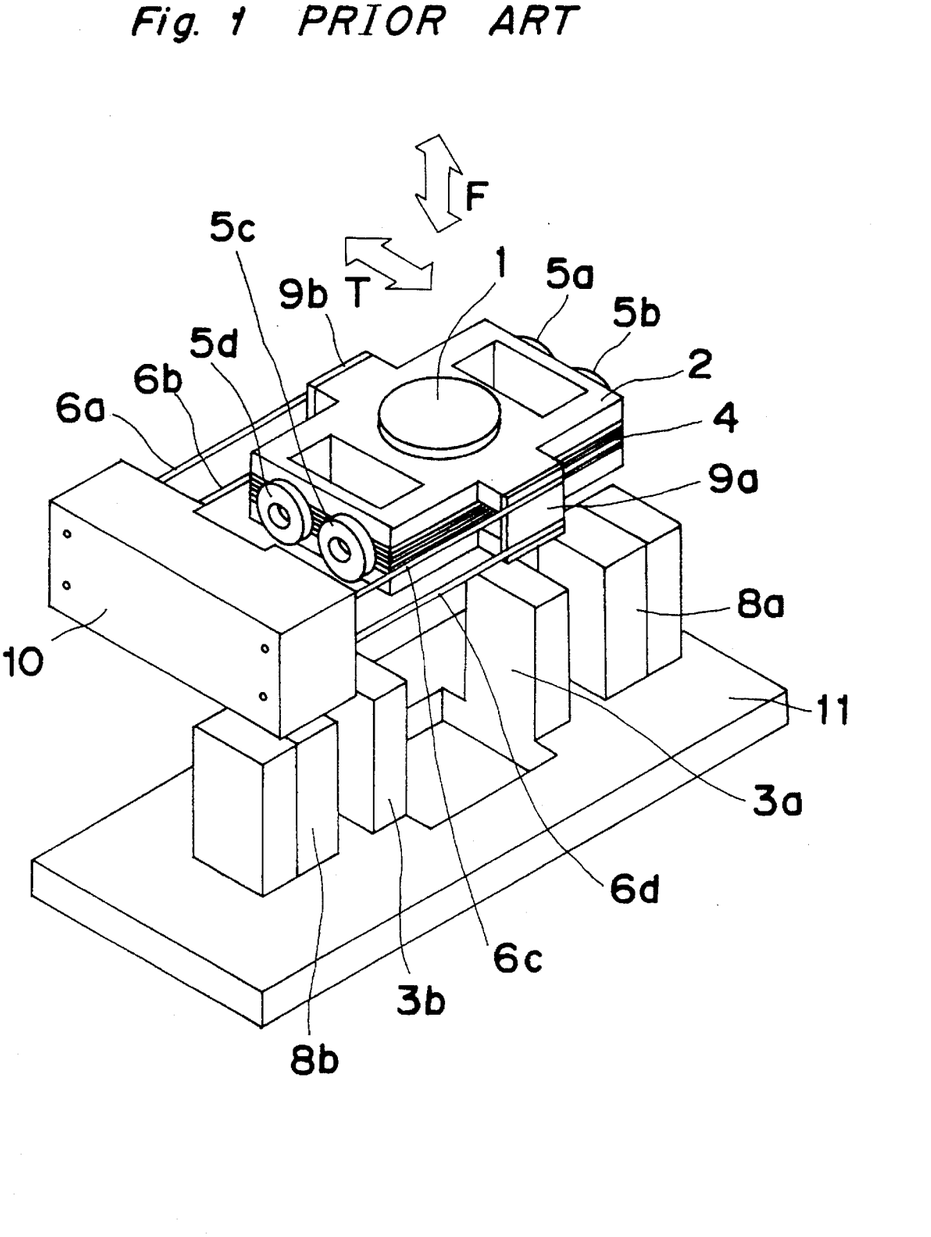
FIG. 1 is an exploded perspective view of a prior art objective lens actuator.

FIG. 1 shows one example of a known objective lens actuator of an optical pickup. The known objective lens actuator includes an objective lens 1, a lens holder 2 for holding the objective lens 1, a focusing coil 4 wound around the lens holder 2 and tracking coils 5a to 5d fixed to the lens holder 2. Elastic members 6a to 6d extend substantially in parallel with each other so as to support the lens holder 2. One end of each of the elastic members 6a and 6b is attached to the lens holder 2 through a printed circuit board 9b, and one end of each of the elastic members 6c and 6d is attached to the lens holder 2 through a printed circuit board 9a. Meanwhile, the other end of each of the elastic members 6a to 6d is attached to a stationary member 10. Magnetic yokes 3a and 3b are formed integrally with a base 11. A magnetic circuit is formed by the magnetic yokes 3a and 3b and permanent magnets 8a and 8b.

Operation of the known objective lens actuator of the above described arrangement is described hereinbelow. In order to correct focusing errors resulting form vertical motion of the recording medium due to its warpage or tracking errors due to radial deviations of the disc, etc., the objective lens 1 is driven in the focusing direction F and the tracking direction T as follows. In order to drive the objective lens 1 in the focusing direction F, the lens holder 2 carrying the objective lens 1 is translated, through the elastic members 6a to 6d, by an electrokinetic type focusing transducer in which the focusing coil 4 is disposed in a gap of the magnetic circuit formed by the permanent magnets 8a and 8b and the magnetic yokes 3a and 3b.

Likewise, in order to drive the objective lens 1 in the tracking direction T, the lends holder 2 carrying the objective lens 1 is translated, through the elastic members 6a to 6d, by an electrokinetic type tracking transducer in which the tracking coils 5a to 5d are disposed in the gap of the magnetic circuit formed by the permanent magnets 8a and 8b and the magnetic yokes 3a and 3b. In addition, the known objective lens actuator as a whole is driven by a motor (not shown) in an access direction on the recording medium, which is identical with the tracking direction T.

Generally in the known objective lens actuator of the above described arrangement, wires of phosphor bronze or the like are used as the elastic members 6a to 6d and opposite ends of the wires are soldered to the printed circuit boards 9a and 9b and the stationary member 10. In the case of a so-called moving coil (MC) type drive in which a drive means for driving the objective lens 1 in the focusing direction F and the tracking direction T secures the focusing coil 4 and the tracking coils 5a to 5d to the lens holder 2, ends of the focusing coil 4 and the tracking coils 5a to 5d are soldered to the wires 6a to 6d and the wires 6a to 6d are used as lead wires. Therefore, when the wires 6a to 6d are attached to the lens holder 2 and the stationary member 10, the wires 6a to 6d should be positioned so as to extend substantially in parallel with each other. Meanwhile, the problem also arises that since the diameter of the wires 6a to 6d is as small as 100 to 150 microns, it is difficult to handle the wires 6a to 6d during assembly.

SUMMARY OF THE INVENTION

Accordingly, an essential object of the present invention is to provide an objective lens actuator including elastic members which have effects identical with those of wires and can easily be not only positioned so as to be fixed in position but handled.

In order to accomplish this object of the present invention, an objective lens actuator according to the present invention includes a pair of leaf springs of a shape of a substantially rectangular frame having a pair of first opposed edge portions acting as elastic members, respectively, and a pair of second opposed edge portions. Since a projection is formed on each of a lens holder and a stationary member, and each of the second opposed edge portions of each of the leaf springs has an engageable portion engageable with the projection, the second opposed edge portions of each of the leaf springs are positioned through engagement of the engageable portion with the projection so as to be secured to the lens holder and the stationary member, respectively.

By the above described arrangement of the objective lens actuator of the present invention, since the elastic members of the leaf spring can be formed by etching, etc., respective positions of the elastic members can be determined in advance. Furthermore, the elastic members can be easily positioned so as to be secured to the lens holder and the stationary member and can be handled with ease.

BRIEF DESCRIPTION OF THE DRAWINGS

The object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 2:
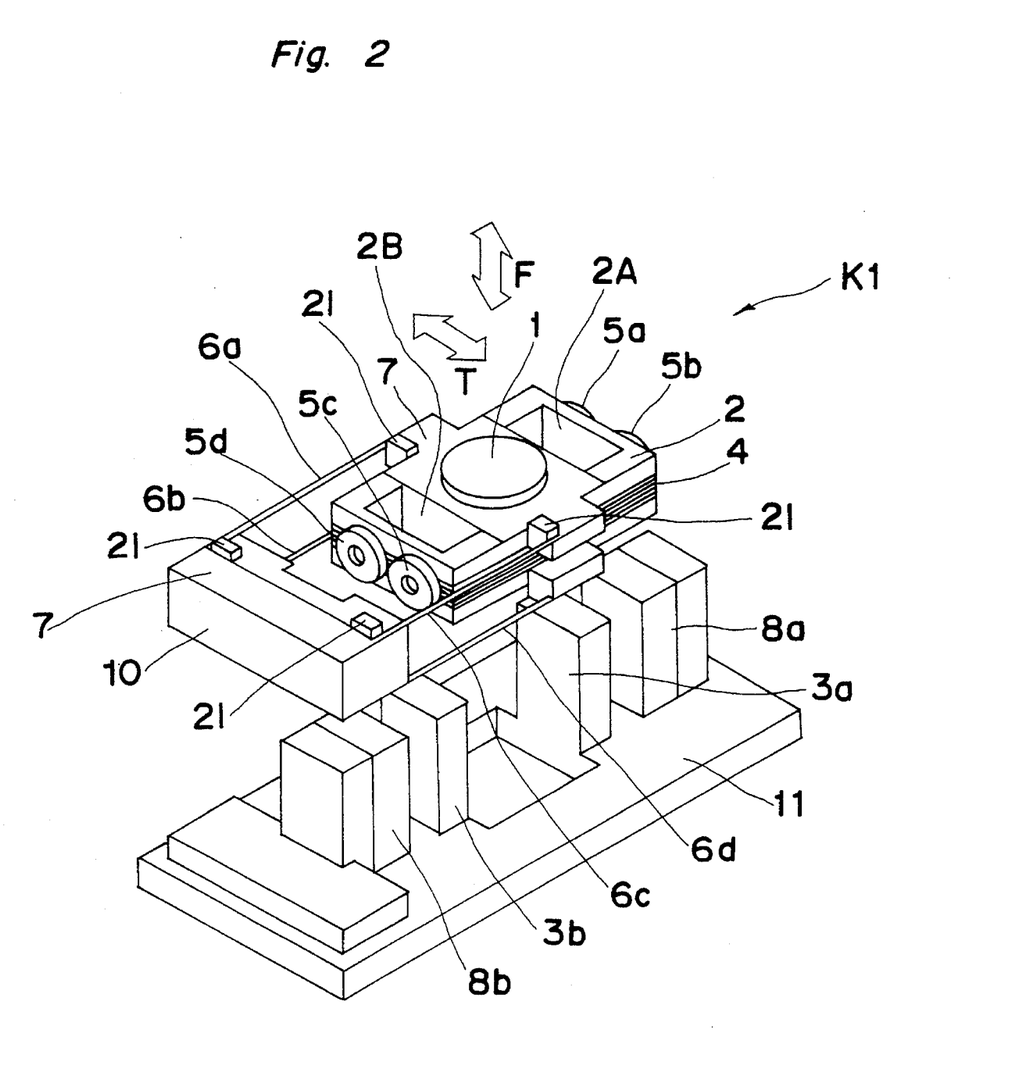
FIG. 2 is an exploded perspective view of an objective lens actuator according to a first embodiment of the present invention.
Figure 3:
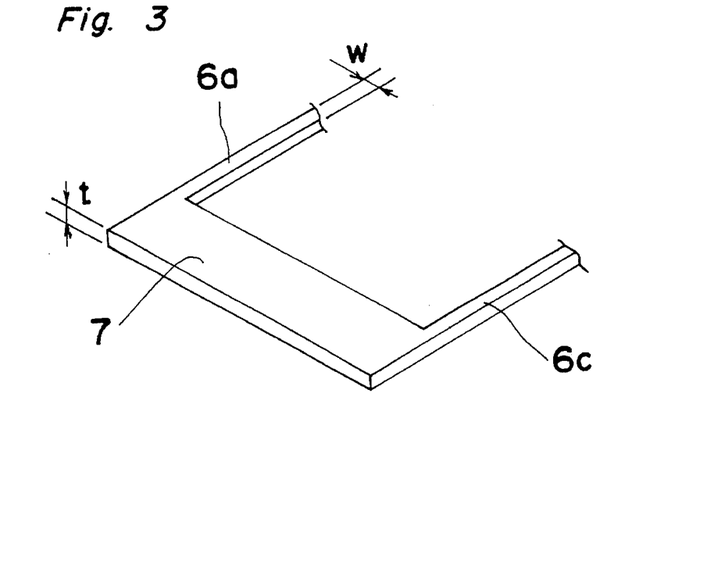
FIG. 3 is an enlarged fragmentary perspective view of a leaf spring employed in the objective lens actuator of FIG. 2.
Figure 4:
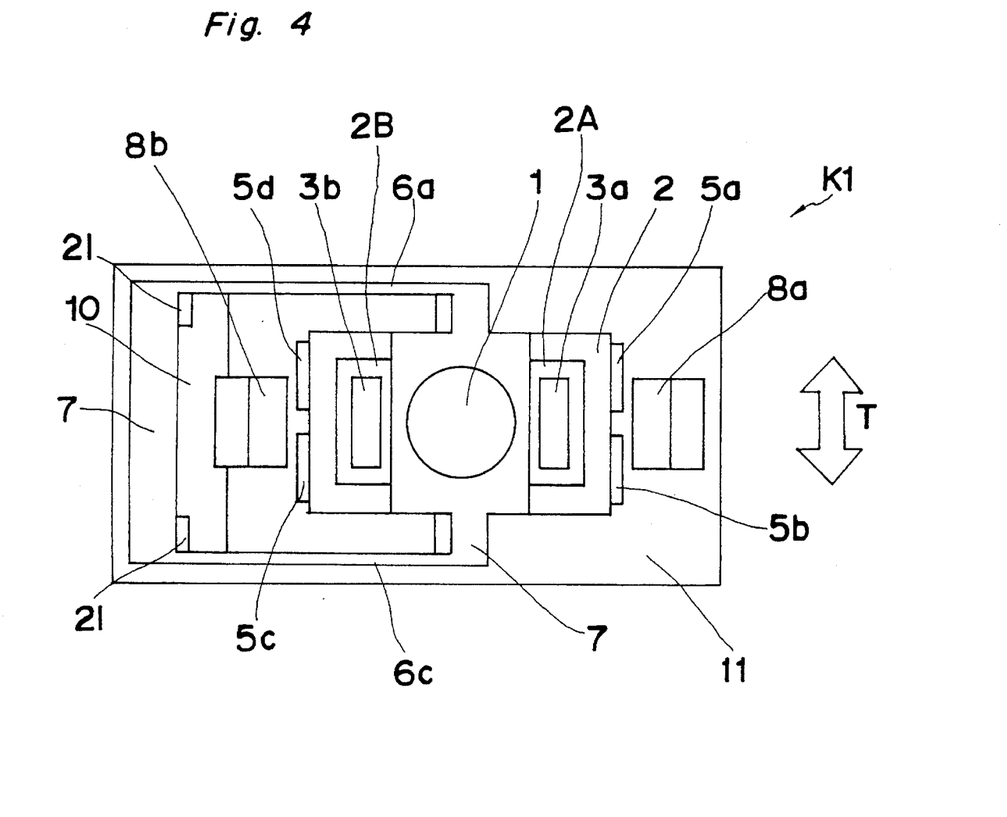
FIG. 4 is a top plan view of the objective lens actuator of FIG. 2 after its assembly.

Referring now to the drawings, there is shown in FIGS. 2 to 4, an objective lens actuator K1 according to a first embodiment of the present invention. In FIG. 2, the objective lens actuator K1 includes an objective lens 1, a lens holder 2 for holding the objective lens 1, a focusing coil 4 wound around the lens holder 2 and tracking coils 5a to 5d fixed to the lens holder 2. Elastic members 6a to 6d extend substantially in parallel with each other so as to support the lens holder 2.

The objective lens actuator K1 further includes a pair of leaf springs 7 having a shape of a substantially rectangular frame. The elastic members 6a and 6c are, respectively, formed by a pair of opposed edge portions of the upper leaf spring 7 which are secured to upper faces of the lens holder 2 and a stationary member 10, respectively, so as to support the lens holder 2. Similarly, the elastic members 6b and 6d are, respectively, formed by a pair of opposed edge portions of the lower leaf spring 7 which are secured to lower faces of the lens holder 2 and the stationary member 10, respectively, so as to support the lens holder 2. Furthermore, magnetic yokes 3a and 3b are formed integrally with a base 11. A magnetic circuit is formed by the magnetic yokes 3a and 3b and permanent magnets 8a and 8b.

Meanwhile, when assembled, the constituent elements of the objective lens actuator K1 occupy positions shown in FIG. 4, respectively. As shown in FIG. 4, the magnetic yokes 3a and 3b are inserted into rectangular through-openings 2A and 2B of the lens holder 2, respectively. Furthermore, the permanent magnet 8a confronts the focusing coil 4 and the tracking coils 5a and 5b, while the permanent magnet 8b confronts the focusing coil 4 and the tracking coils 5c and 5d. Thus, in the rightward and leftward directions in FIG. 4, the focusing coil 4 and the tracking coils 5a and 5b are disposed between the magnetic yoke 3a and the permanent magnet 8a, while the focusing coil 4 and the tracking coils 5c and 5d are disposed between the magnetic yoke 3b and the permanent magnet 8b.

Operation of the objective lens actuator K1 of the above described arrangement is described hereinbelow. In order to correct focusing errors resulting from vertical motion of a disc due to its warpage or tracking errors due to radial deviations of the disc, etc., the objective lens 1 is driven in a focusing direction F and a tracking direction T as follows. In order to drive the objective lens 1 in the focusing direction F, the lens holder 2 carrying the objective lens 1 is translated, through the elastic members 6a to 6d, by an electrokinetic type focusing transducer in which the focusing coil 4 is disposed in a gap of the magnetic circuit formed by the permanent magnets 8a and 8b and the magnetic yokes 3a and 3b.

Likewise, in order to drive the objective lens 1 in the tracking direction T, the lens holder 2 carrying the objective lens 1 is translated, through the elastic members 6a to 6d, by an electrokinetic type tracking transducer in which the tracking coils 5a to 5d are disposed in the gap of the magnetic circuit formed by the permanent magnets 8a and 8b and the magnetic yokes 3a and 3b. In addition, the objective lens actuator K1 as a whole is driven by a motor (not shown) in an access direction on a recording medium, which is identical with the tracking direction T.

A pair of rectangular projections 21 are provided on the upper face of the lens holder 2 so as to confront another pair of rectangular projections 21 provided on the upper face of the stationary member 10, respectively. Through engagement of inner peripheral edges of the upper leaf spring 7 with the projections 21, the upper leaf spring 7 is positioned so as to be secured to the upper faces of the lens holder 2 and the stationary member 10. Although not specifically shown, the same applies to the lower leaf spring 7. At the time of assembly of the objective lens actuator K1, since the elastic members 6a to 6d are not required to be handled directly, the objective lens actuator K1 having the elastic members 6a to 6d can be handled easily. Furthermore, if fiscoelastic material (not shown) such as butyl rubber, silicone rubber or the like is molded into the elastic members 6a to 6d (i.e. the leaf springs 7), a damping method having excellent mass production properties can be achieved.

Figure 5:
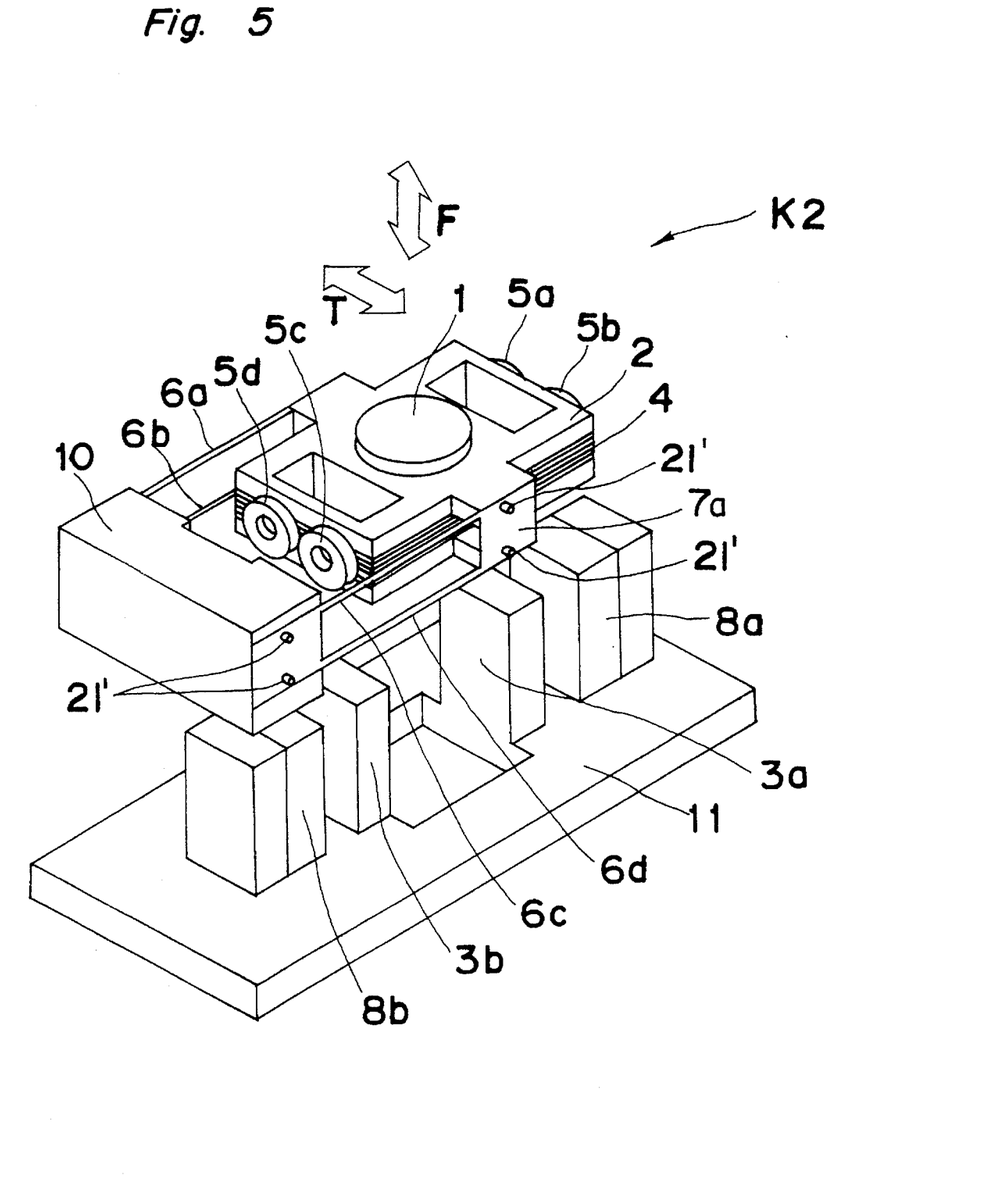
FIG. 5 is an exploded perspective view of an objective lens actuator according to a second embodiment of the present invention.
Figure 6:
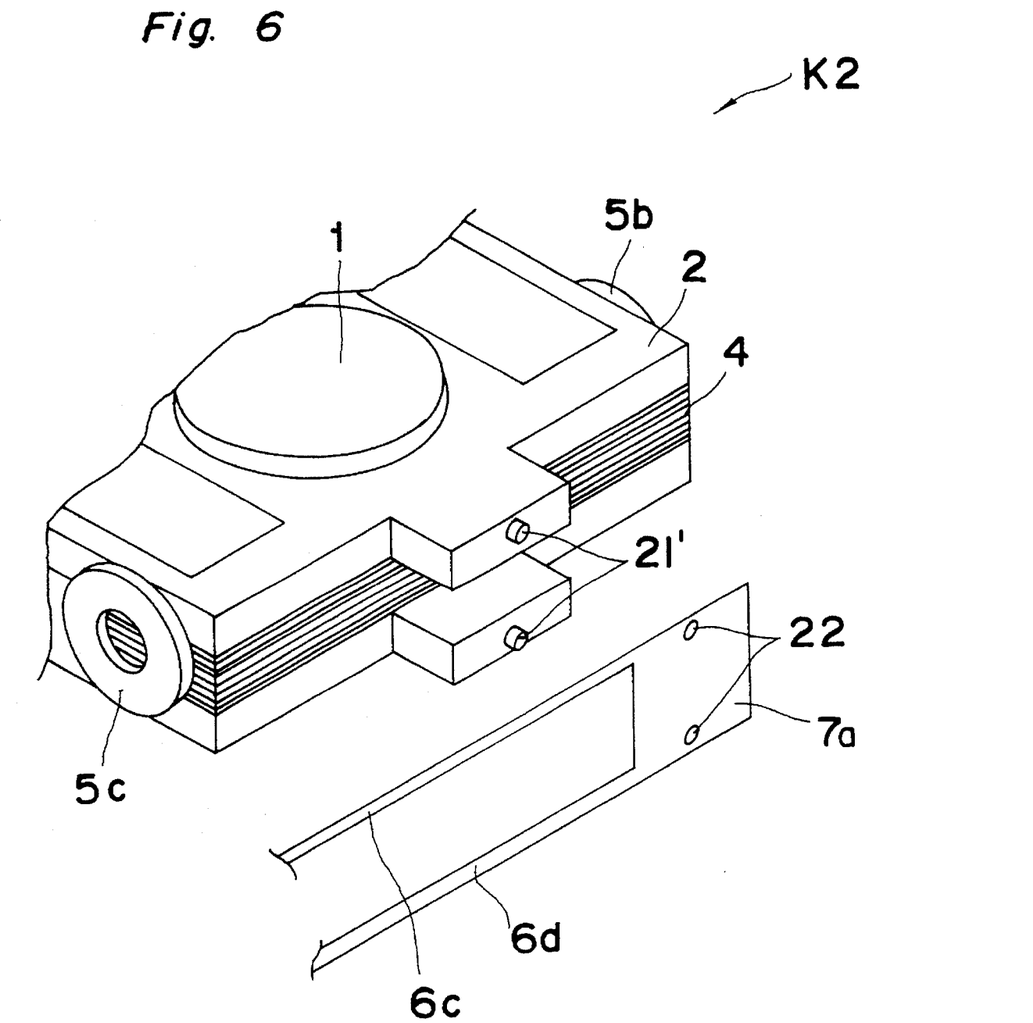
FIG. 6 is a fragmentary perspective view showing positioning of a leaf spring employed in the objective lens actuator of FIG. 5.

FIG. 5 shows an objective lens actuator K2 according to a second embodiment of the present invention. The objective lens actuator K2 is structurally different from the objective lens actuator K1 in that the leaf springs 7 are disposed in a plane perpendicular to the focusing direction F in the objective lens actuator K1, while the leaf springs 7a are provided in a plane perpendicular to the tracking direction T in the objective lens actuator K2. As shown in FIGS. 5 and 6, a pair of cylindrical projections 21' are provided on each of opposite side faces of each of the lens holder 2 and the stationary member 10, while each of the leaf springs 7a is formed with circular holes 22 engageable with the projections 21'. Since other features of the objective lens actuator K2 are similar to those of the objective lens actuator K1, description thereof is abbreviated for the sake of brevity.

By the above described arrangement of the objective lens actuator K2, the same effects as those of the objective lens actuator K1 can be obtained.

Figure 7:
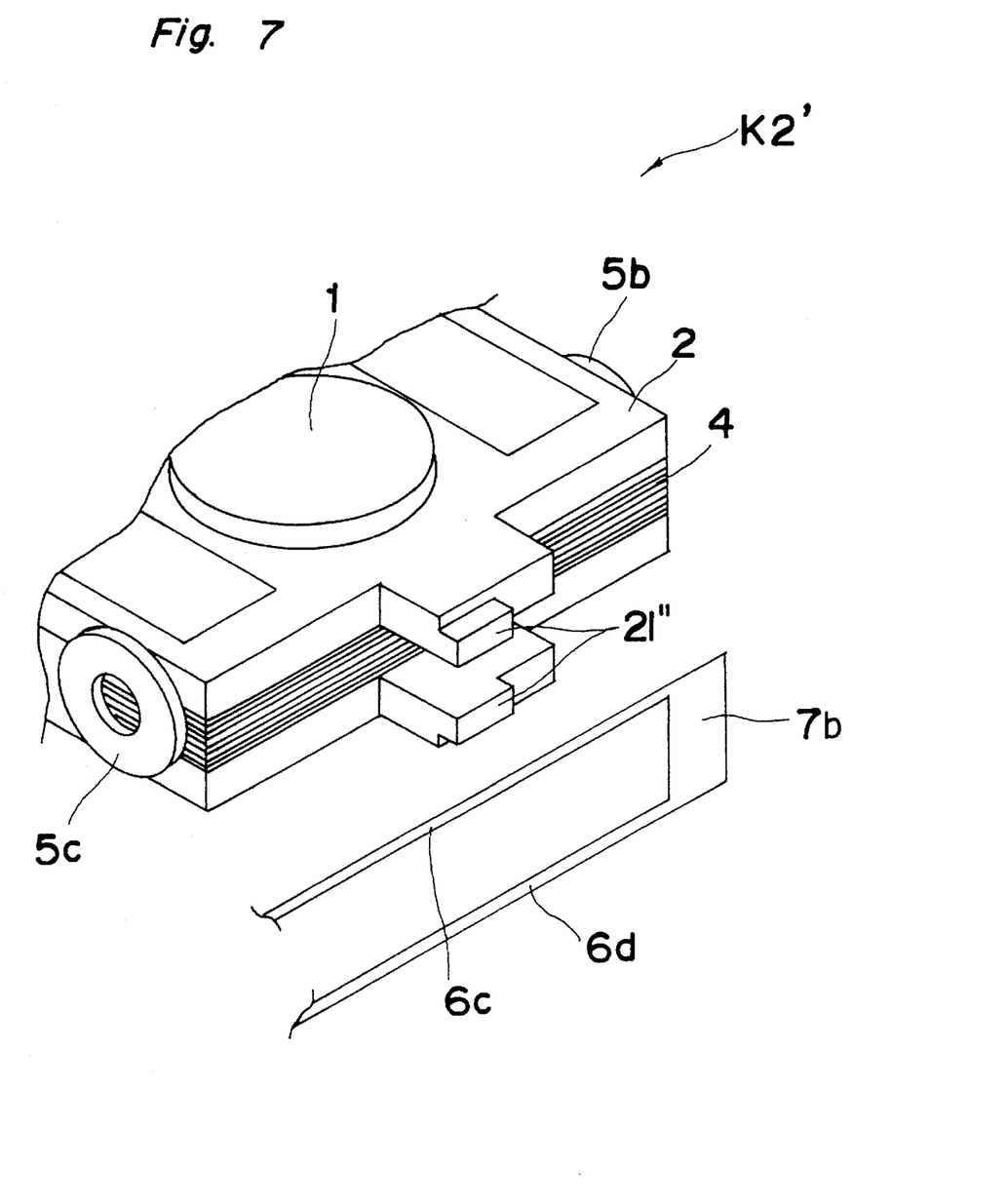
FIGS. 7 and 8 are views similar to FIG. 6, particularly showing first and second modifications thereof, respectively.
Figure 8:
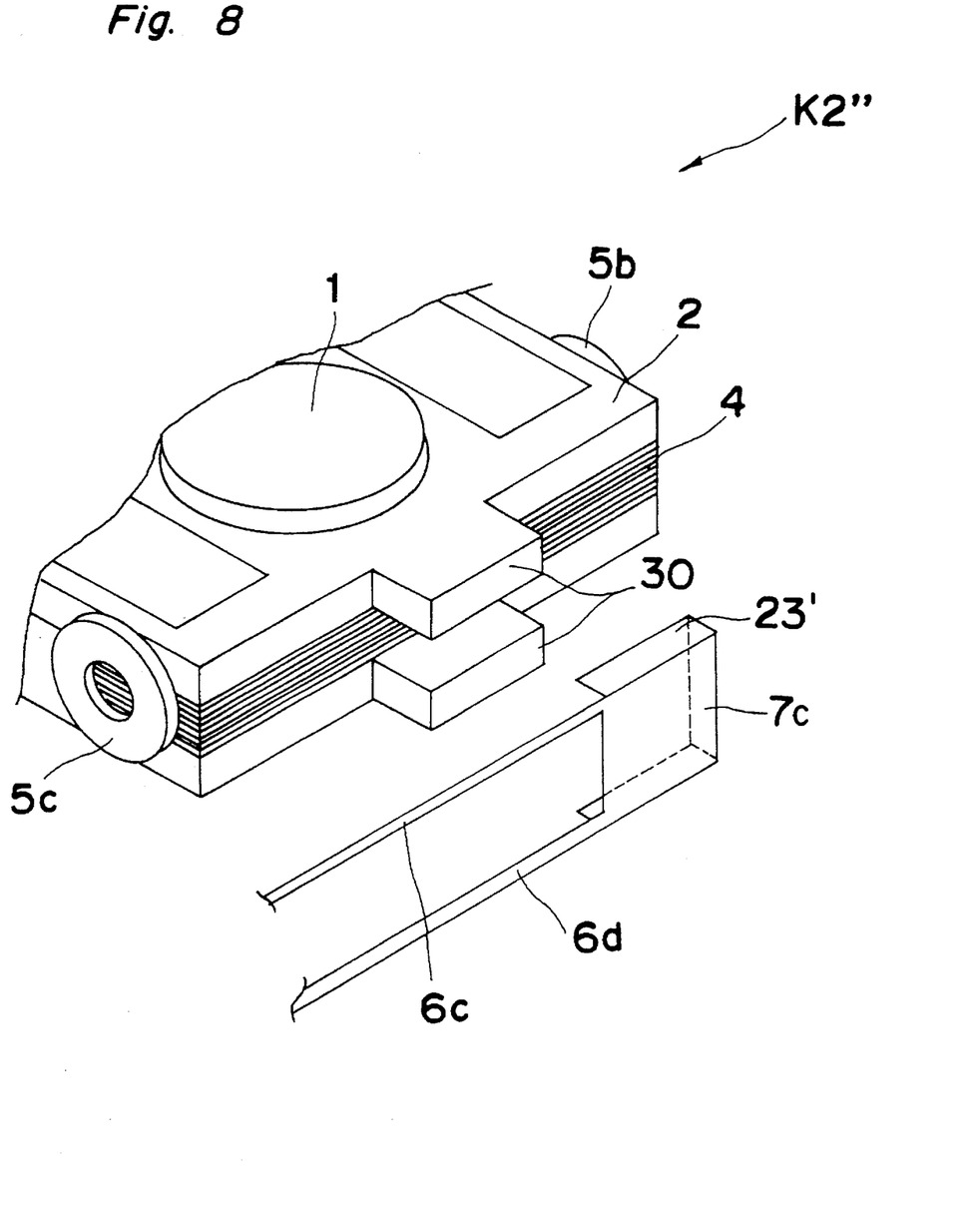

FIGS. 7 and 8 show objective lens actuators K2' and K2" which are first and second modifications of the objective lens actuator K2. In the objective lens actuator K2', the cylindrical projections 21' of the objective lens actuator K2 are replaced by rectangular projections 21" engageable with inner peripheral edges of the leaf spring 7b. Meanwhile, in the objective lens actuator K2", three bent portions 23' are provided at each of opposite ends of the leaf springs 7c so as to be brought into engagement with lugs 30 provided on each of the opposite side faces of each of the lens holder 2 and the stationary member 10. In the objective lens actuators K2, K2' and K2" since the elastic members 6a to 6d themselves are not required to be positioned, the leaf springs can be positioned so as to be secured to the lens holder 2 and the stationary member 10 without the need for using an expensive jig.

Meanwhile, in the first and second embodiments of the present invention, if a thickness t of the leaf spring is so set as to be identical with a width w of each of the elastic members 6a to 6d measured in the plane of the leaf spring 7 as shown in FIG. 3, the spring constant of the elastic members 6a to 6d in the focusing direction F can be made identical with that in the tracking direction T. Needless to say, the thickness t of the leaf spring 7 and the width w of each of the elastic members 6a to 6d can be set to other selected values, and thus the spring constants of the elastic members 6a to 6d in the focusing direction F and in the tracking direction T can be designed relatively freely.

Figure 9:
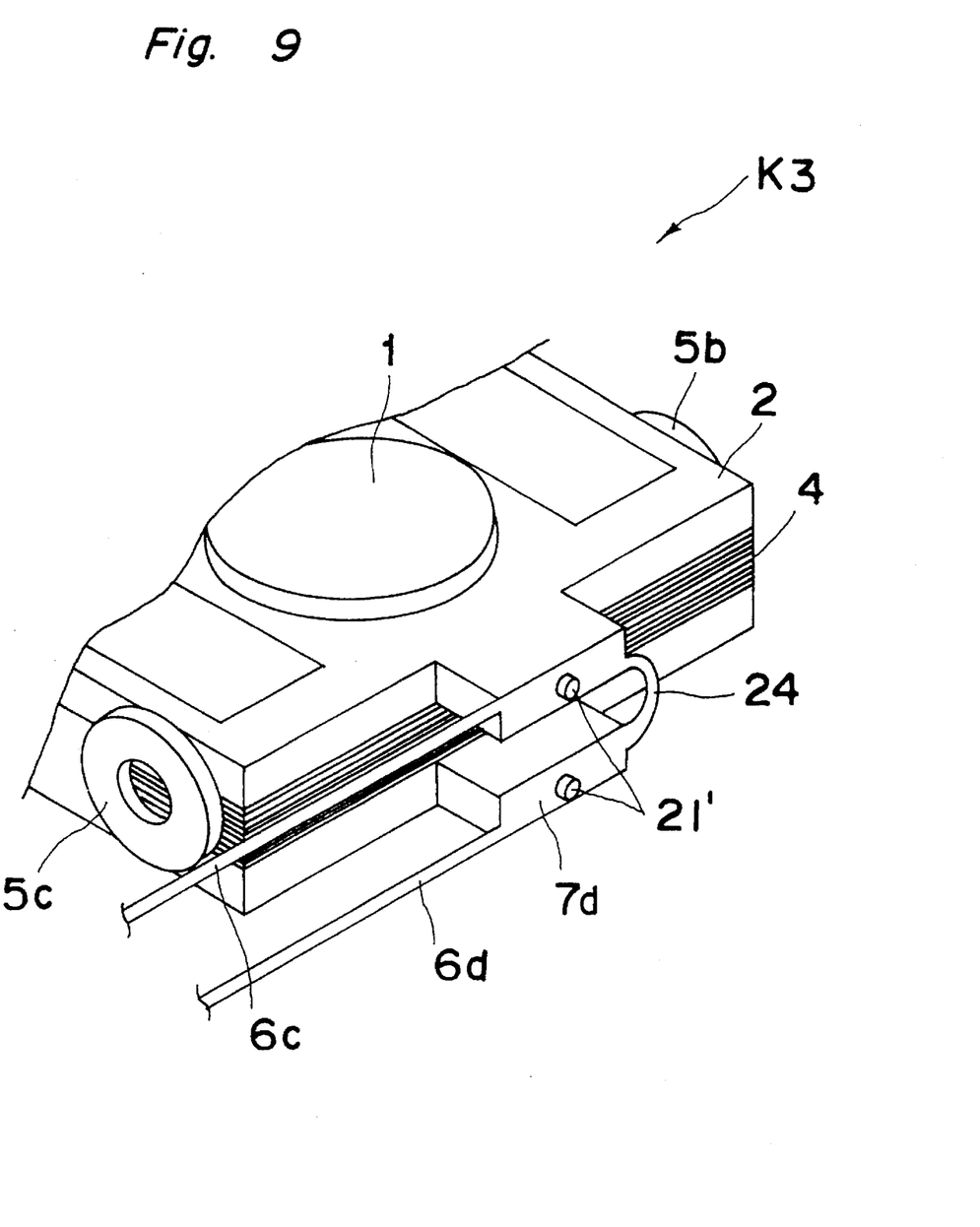
FIG. 9 is a fragmentary perspective view of an objective lens actuator according to a third embodiment of the present invention.

FIG. 9 shows an objective lens actuator K3 according to a third embodiment of the present invention. A basic structure of the objective lens actuator K3 is similar to that of the objective lens actuator K2. In the objective lens actuator K3, in order to use the elastic members 6a to 6d as lead wires in a moving coil (MC) type drive, the leaf spring 7d is made of solderable material such as phosphor bronze, beryllium-copper or the like, and a pair of arcuate coupling strips 24 which are tearable from the leaf spring 7d after the leaf spring 7d has been fixed to the lens holder 2 and the stationary member 10 are provided at portions of the leaf spring 7d other than at the elastic members 6c and 6d, for example, at opposite ends of the leaf spring 7d. Therefore, after ends of the focusing coil 4 and the tracking coils 5a to 5d have been soldered to portions of the lens holder 2, on which the leaf springs 7d are mounted, and portions of the stationary member 10, on which the leaf springs 7d are mounted, the coupling strips 24 are torn from the leaf springs 7d. As a result, the elastic members 6a to 6d can be positioned quite easily so as to be secured to the lens holder 2 and the stationary member 10, and the elastic members 6a to 6d can be used also as lead wires.

In the objective lens actuator K3, an MC type drive has been described. However, a moving magnet (MM) type drive in which the permanent magnets 8a and 8b are fixed to the lens holder 2 is also applicable to the objective lens actuator K3. If the MM type drive is employed in the objective lens actuator K3, the elastic members 6a to 6d are not required to be used as lead wires but the same effects as those of the MC type drive can be, needless to say, obtained.

Figure 10:
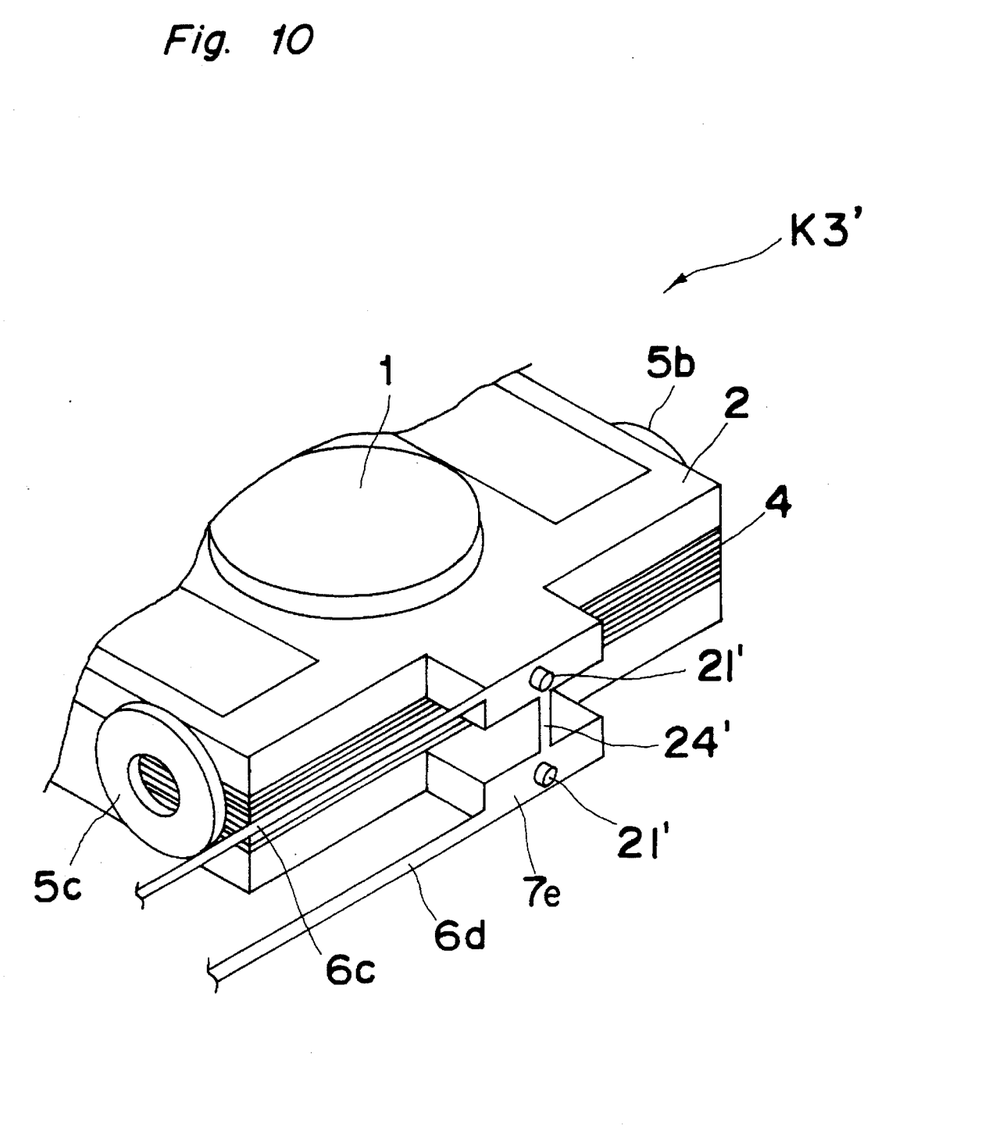
FIG. 10, is a view similar to FIG. 9, particularly showing a modification thereof.

FIG. 10 shows an objective lens actuator K3' which is a modification of the objective lens actuator K3. In the objective lens actuator K3' the arcuate coupling strips 24 of the objective lens actuator K3 are replaced by linear coupling strips 24'.

Figure 11:
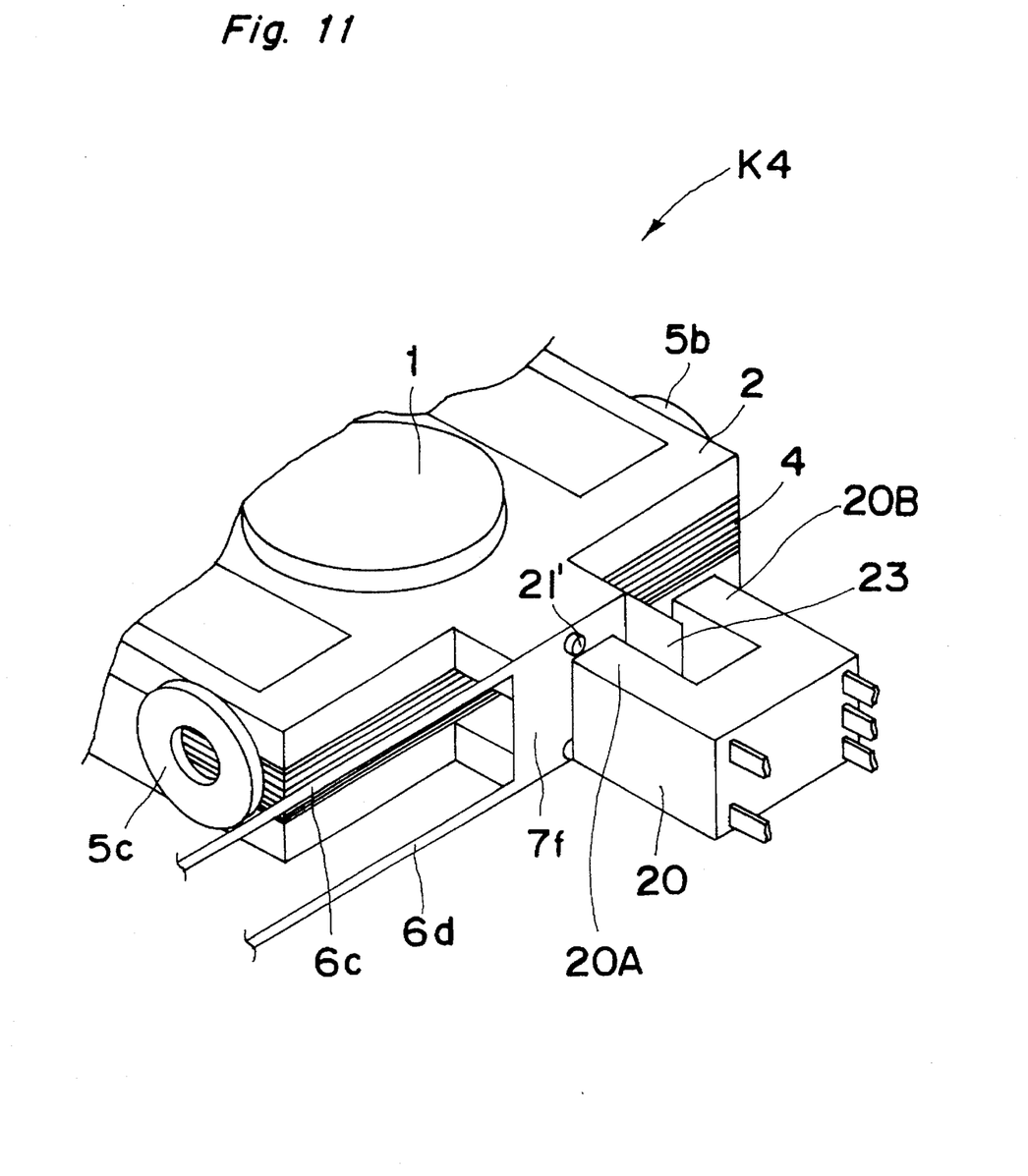
FIG. 11 is a fragmentary perspective view of an objective lens actuator according to a fourth embodiment of the present invention.

FIG. 11 shows an objective lens actuator K4 according to a fourth embodiment of the present invention. A basic structure of the objective lens actuator K4 is similar to that Of the objective lens actuator K2. When the objective leans actuator K4 as a whole is driven by the motor in the access direction on the recording medium, which is identical with the tracking direction T, the tracking servo control is generally set to be inoperative. Therefore, when a force is applied to a movable portion including the objective lens 1, the lens holder 2, etc., residual vibrations are produced in the movable portion in the tracking direction T. Thus, in order to perform tracking servo control again after completion of movement in the access direction, it is necessary to wait until the residual vibrations of the movable portion diminish to some degree, which is problematical in reducing access time. As one of countermeasures for solving this problem, it is possible to adopt positional detection by a photosensor 20. The amount of displacement of the movable portion (and thus of the objective lens) in the optical axis direction and the radial direction is detected by the photosensor 20 and is fed back at the time of access so as to lessen the residual vibrations of the movable portion such that access time is shortened. In FIG. 11, the photosensor 20 is of a so-called transmission type and has a light source (not shown) such as an LED and opposed sensor portions 20A and 20B. If a portion of the leaf spring 7f, for example, a bent portion 23 acts also as a reflecting plate or a shielding plate for the photosensor so as to be interposed between the sensor portions 20A and 20B, the number of components of the objective lens actuator K4 can be reduced and distance between the light source and the photosensor 20 can be reduced, thereby resulting in improvement of detection sensitivity.

Figure 12:
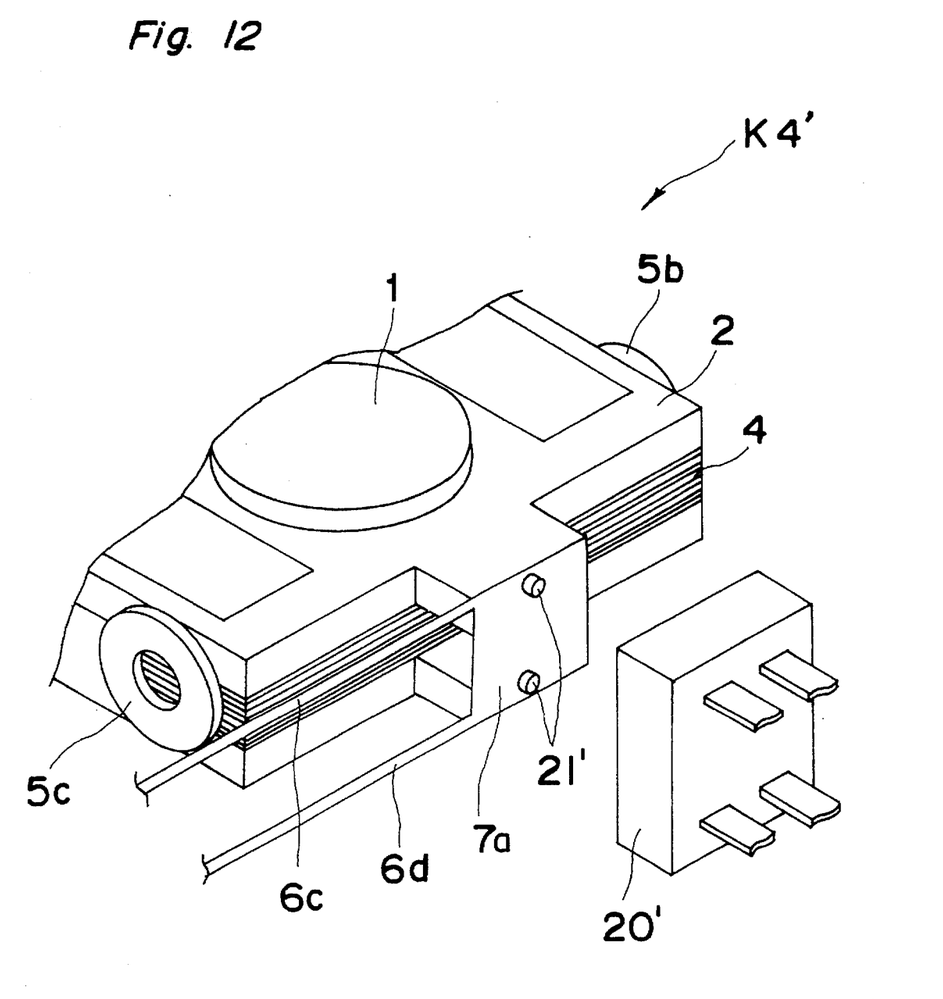
FIG. 12 is a view similar to FIG. 11, particularly showing a modification thereof.

FIG. 12 shows an objective lens actuator K4' which is a modification of the objective lens actuator K4. In FIG. 12, the photosensor 20 is of a so-called reflection type in which a light source such as an LED and the photosensor are provided integrally and a quantity of reflected light from the movable portion is detected so as to detect a position of the movable portion. If the leaf spring 7a is employed as a reflecting surface of the movable portion, stable detection of position of the movable portion, free from drop or scatter of reflectance, can be performed.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. An objective lens actuator for use in optically writing or reading information on a disklike recording medium, said actuator comprising:

a base;

a stationary member mounted on said base;

a movable member, including a lens holder and an objective lens held by said lens holder, movably mounted for movement relative to said base in a radial direction parallel to a face of the recording medium and in an optical axis direction perpendicular to the face of the recording medium;

a pair of leaf springs, each of which is of a substantially rectangular frame shape having a pair of first opposing edge portions and a pair of second opposing edge portions, said pairs of first and second opposing edge portions defining therebetween, for each of said leaf springs, a single central opening, and said pairs of first opposing edge portions of said pair of leaf springs constituting four elastic members, respectively;

a drive means for driving said movable member in the radial direction and in the optical axis direction;

wherein said elastic members each have a first end fixed to said stationary member and a second end fixed to said movable member so as to longitudinally extend substantially in parallel with each other and substantially perpendicularly to the radial direction and the optical axis direction;

wherein said elastic members are fixed to said stationary member by projections formed on said stationary member, said projections formed on said stationary member extending through said single central openings of said leaf springs, respectively; and said elastic members are fixed to said movable member by projections formed on said movable member, said projections formed on said movable member extending through said single central openings of said leaf springs, respectively.

2. An objective lens actuator as recited in claim 1, wherein said projections formed on said stationary member respectively project away from said stationary member in said radial direction; and said projections formed on said movable member respectively project away from said movable member in said radial direction.

3. An objective lens actuator as recited in claim 1, wherein said projections formed on said stationary member respectively project away from said stationary member in said optical axis direction; and said projections formed on said movable member respectively project away from said movable member in said optical axis direction.

4. An objective lens actuator as recited in claim 1, further comprising a magnetic circuit including a permanent magnet mounted to said base and a magnetic yoke mounted to said base; and wherein said drive means comprises an electrokinetic type focusing transducer, which includes a focusing coil disposed in a gap of said magnetic circuit, for driving said movable member in the optical axis direction, and an electrokinetic type tracking transducer, which includes a tracking coil disposed in the gap of said magnetic circuit, for driving said movable member in the radial direction.

5. An objective lens actuator as recited in claim 1, wherein said leaf springs are formed of solderable material comprising one of phosphor bronze and beryllium-copper.

6. An objective lens actuator as recited in claim 1, wherein a width of each of said elastic members is substantially identical with a thickness of each of said leaf springs.

* * * * *